(12) United States Patent
Chinner et al.

(10) Patent No.: US 9,361,474 B2
(45) Date of Patent: Jun. 7, 2016

(54) NETWORK FILESYSTEM ASYNCHRONOUS I/O SCHEDULING

(71) Applicant: Silicon Graphics International, Corp., Milpitas, CA (US)

(72) Inventors: David Chinner, Victoria (AU); Michael Anthony Gigante, Victoria (AU)

(73) Assignee: SILICON GRAPHICS INTERNATIONAL CORP., Milpitas, CA (US)

( * ) Notice: Subject to any disclaimer, the term of this patent is extended or adjusted under 35 U.S.C. 154(b) by 0 days.

(21) Appl. No.: 14/141,278

(22) Filed: Dec. 26, 2013

(65) Prior Publication Data
US 2014/0108458 A1 Apr. 17, 2014

Related U.S. Application Data

(63) Continuation of application No. 10/620,797, filed on Jul. 17, 2003, now Pat. No. 8,635,256.

(51) Int. Cl.
*G06F 17/30* (2006.01)
*G06F 21/62* (2013.01)

(52) U.S. Cl.
CPC ...... *G06F 21/6218* (2013.01); *G06F 17/30067* (2013.01)

(58) Field of Classification Search
None
See application file for complete search history.

(56) References Cited

U.S. PATENT DOCUMENTS

| | | | |
|---|---|---|---|
| 6,092,048 A | 7/2000 | Nakaoka | |
| 6,754,690 B2 | 6/2004 | Larson | |
| 6,971,101 B1 | 11/2005 | Clayton et al. | |
| 7,065,624 B1 | 6/2006 | Zahavi | |
| 8,635,256 B2 | 1/2014 | Chinner | |
| 2003/0070055 A1* | 4/2003 | Johnson et al. | 711/202 |
| 2004/0015762 A1 | 1/2004 | Klotz et al. | |

OTHER PUBLICATIONS

Shreedhar, M., and Varghese, George, 1995. Efficient fair queuing using deficit round robin. In proceedings of the conference on Applications, technologies, architectures, and protocols for computer communication (SIGCOMM '95), David Oran (Ed.). ACM, New York, NY, USA, 231-242. DOI=10.1145/217382.217453 http://doi.acm.org/10-1145/217382.217453.
U.S. Appl. No. 10/620,797 Office Action mailed Jul. 11, 2013.

(Continued)

*Primary Examiner* — Syed Hasan
(74) *Attorney, Agent, or Firm* — Polsinelli LLP

(57) ABSTRACT

Resource acquisition requests for a filesystem are executed under user configurable metering. Initially, a system administrator sets a ratio of N:M for executing N read requests for M write requests. As resource acquisition requests are received by a filesystem server, the resource acquisition requests are sorted into queues, e.g., where read and write requests have at least one queue for each type, plus a separate queue for metadata requests as they are executed ahead of any waiting read or write request. The filesystem server controls execution of the filesystem resource acquisition requests to maintain the ratio set by the system administrator.

15 Claims, 2 Drawing Sheets

(56) References Cited

OTHER PUBLICATIONS

U.S. Appl. No. 10/620,797 Final Office Action mailed Jul. 22, 2011.
U.S. Appl. No. 10/620,797 Office Action mailed Feb. 1, 2011.
U.S. Appl. No. 10/620,797 Final Office Action mailed May 15, 2007.
U.S. Appl. No. 10/620,797 Office Action mailed Sep. 29, 2006.
U.S. Appl. No. 10/620,797 Office Action mailed Jan. 11, 2006.

* cited by examiner

NETWORK FILESYSTEM ASYNCHRONOUS I/O SCHEDULING

CROSS-REFERENCE TO RELATED APPLICATIONS

The present application is a continuation and claims the priority benefit of U.S. patent application Ser. No. 10/620,797 filed Jul. 17, 2003, now U.S. Pat. No. 8,635,256 that issued on Jan. 21, 2014, the disclosure of which is incorporated herein by reference.

BACKGROUND OF THE INVENTION

1. Field of the Invention

The present invention is directed to processing of filesystem resource acquisition requests or access requests and, more particularly, to avoiding monopolization of access to a filesystem by one type of filesystem access request.

2. Description of the Related Art

A network filesystem, such as NFS from Silicon Graphics, Inc. (SGI) of Mountain View, Calif., provides access to files in centralized storage by client computer systems in a client-server operating environment. Such network filesystems process resource acquisition requests for read and write access to data and to obtain metadata or information about the data, such as the size of the data, access permissions on the data, etc.

Conventionally, resource acquisition requests are stored in one or more queues upon receipt while they await execution by a process that controls access to the filesystem. When more than one queue is used, the resource acquisition requests may be sorted by read, write and metadata requests and, and by different subtypes within these types, e.g., within read requests by whether a read-ahead operation should be performed, or whether a write contains data or only a synchronization request.

Regardless of whether all resource acquisition requests are stored in a single queue, or sorted into multiple queues, a single type of resource acquisition request may monopolize access to a filesystem, or a particular type of resource acquisition request which is desired to be given higher priority may be slowed by execution of less important resource acquisition requests. For example, an application may generate a sequence of write operations that monopolize a filesystem if requests in one queue at a time are executed until the queue is exhausted or there is only one queue, or a read of a block of data may be delayed by less important metadata and write access requests in a system which services the queues in a round-robin fashion. No known system is flexible enough to allow users, i.e., system administrators, to tune the processing of resource acquisition requests for a particular operating environment.

SUMMARY OF THE PRESENTLY CLAIMED INVENTION

It is an aspect of the present invention to prevent one type of filesystem resource acquisition request from monopolizing access to a filesystem.

It is another aspect of the present invention to prevent less important filesystem resource acquisition requests from slowing execution of more important filesystem resource acquisition requests.

It is a further aspect of the present invention to prevent filesystem resource acquisition requests that have no latency requirements from slowing the execution of filesystem resource acquisition requests that require minimal latency.

It is yet another aspect of the present invention to provide configurable metering for different types of filesystem resource acquisition requests.

The above aspects can be attained by a method of processing resource acquisition requests, including scheduling execution of the resource acquisition requests in accordance with user configurable metering. Preferably, the resource acquisition requests are sorted into queues with at least one queue for read requests and at least one queue for write requests. At least one other queue may be provided for metadata resource acquisition requests. Preferably, metering of the resource acquisition requests is configured in response to input from an administrator of the system, by specifying a first number of read requests to be performed for a second number of write requests, as long as there are both read and write requests that are queued. Preferably, a maximum number of threads are established for executing resource acquisition requests in response to the input from the administrator.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

Figure 1:
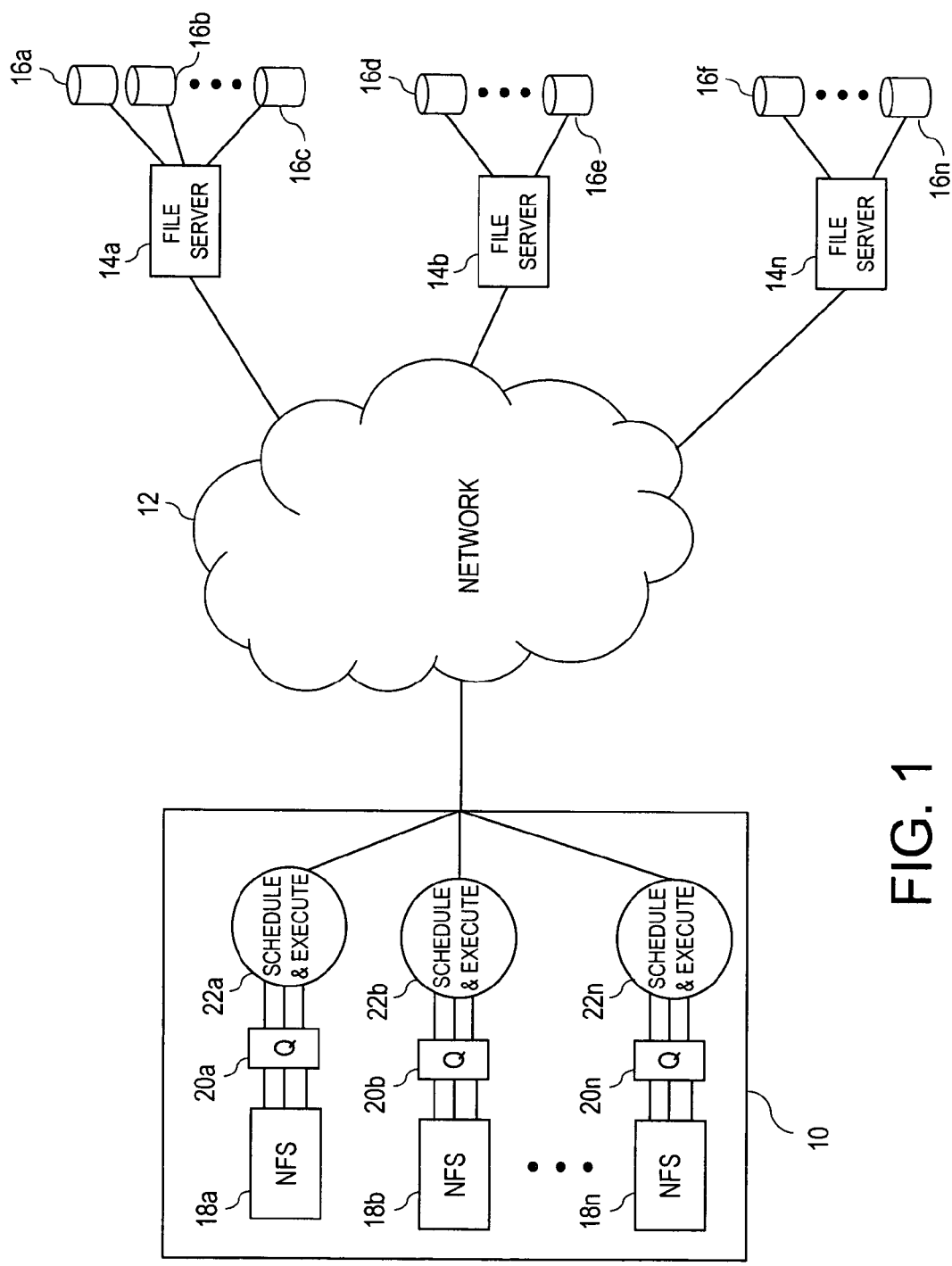
FIG. 1 is a block diagram of a system to which the present invention can be applied.

A simplified drawing of a system to which the present invention may be applied is illustrated in FIG. 1. Client node 10 is connected via network 12 to at least one filesystem server 14a, 14b, ... 14n on network 12. Depending on the type of system, each filesystem server 14 may provide connection to one or more data stores 16. In some systems, such as storage area networks, the network 12 may be directly connected to the data stores 16a, 16b, ... 16n. Client node 10 uses one of client network filesystems 18a, 18b, ... 18n in accessing each data store 16. Client node 10 may be connected to many data stores, e.g., 16a, 16b, ... 16c, on a single filesystem server, e.g., 14a, as well as many separate data stores, e.g., 16a, 16d, 16f on many different filesystem servers, e.g. 14a, 14b, ... 14n.

Any communication requests generated by a client network filesystem, e.g., 18a, will be directed to the filesystem server 14 with responsibility for the data store(s) 16 storing the data for filesystem 18a. These requests are often asynchronous and client network filesystems 18 can generate large numbers of requests in a short period of time. To optimize processing of these communication requests, each client network filesystem 18 has a set of request queues 20a, 20b, ... 20n that store requests that have not been sent to the corresponding filesystem server, e.g., 18a. These queues are serviced by a scheduler and set of execution threads 22a, 22b, ... 22n which are responsible for determining the best request to send and executing the communication procedures to fulfill the request.

Figure 2:
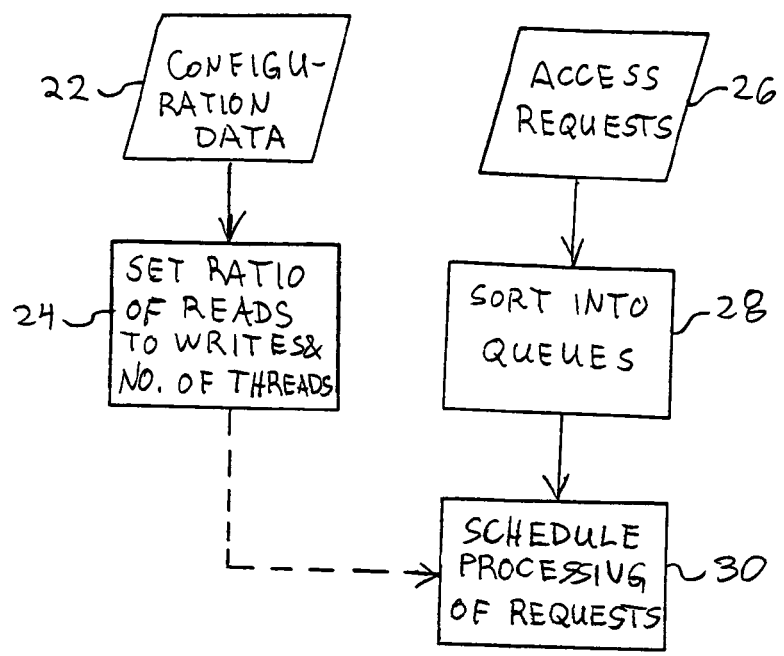
FIG. 2 is a flowchart of a method according to the present invention.

As illustrated in FIG. 2, client node 10 receives configuration data 22 which is used to set a ratio N:M of N read access requests that should be processed for M write access requests. In addition, the number of threads used to process the access requests may be set 24.

Metadata requests are considered to be both of higher priority and more latency sensitive than either read or write requests. They are also unlikely to occur in such numbers as to cause read or write starvations. As a result, preferably the metadata request queue should be given an infinite quota and hence the ratio of metadata:read:write requests when all are queued is infinity:M:N. In practice, enough metadata requests are not received for this to cause starvation of the read or write queues. Hence if, at any point in time, a metadata request is queued waiting to be executed, then the next available execution thread will process the metadata request ahead of any queued read or write requests.

When resource acquisition requests 26 are received by file system server 14, the resource acquisition requests are sorted 28 into queues. In a system executing under IRIX, where little improvement is found from sorting read requests into different categories or write requests into different categories, three queues are preferably used, one for read requests, one for write requests and one for metadata requests. Under other operating systems, additional queues (or just two queues) could be used. For example, an open network computing (ONC) NFS available from Sun Microsystems, Inc. of Santa Clara, Calif. has five queues, one for read-ahead requests, another for read requests, one for write requests, another for write synchronization requests and one for directory read requests. In the ONC NFS, requests are taken from the queues in a round-robin fashion. A number of consecutive requests are taken from each queue before moving on to the next queue.

Filesystem server 14 includes at least one computer readable medium including at least one program embodying a method of processing requests to access computer resources. When an access request occurs, it is first sorted into the relevant queue and a execution thread is signaled to run. The first idle execution thread will then run the request quota scheduling 30 to the sorted queues in accordance with the ratios previously set 24 by the administrator of the system to select the request it is to execute.

The execution thread then initiates a series of communications to fileserver 18 to transfer the required data to fulfill the current request. This can require multiple communications and take a significant period of time. Once the request has been completed, the execution thread will mark the request as completed, and return to the sorted queues to determine whether there is another request to execute. If there are no more requests to execute, the execution thread will then sleep until new requests to process have arrived in the sorted queues.

The present invention has been described with respect to an embodiment using SGI equipment running NFS under IRIX. However, it is not limited to such an operating environment and can be used with many different filesystems. For example, it could be used in the aforementioned ONC NFS implementation to improve it. The invention could also be used on an NFS server to prioritize the order of responses to different types of requests to improve the response time of a fileserver to latency sensitive requests without causing starvations in different layers of the server. In the NFS layer the invention could be used to expedite metadata requests over reads and writes to a single client. In the network interface layer the invention could be used to expedite small responses (typically metadata responses) over large responses (typically read responses) between all traffic that is routed through the network interface.

For a general case of n queues, every queue ($q_1, q_2, \ldots, q_n$) has a quota ($r_1, r_2, \ldots r_n$) that determines the number of requests that can be issued from that queue while there are other requests held on other queues and the quota for those queues is not exhausted, and every queue has a importance rating. The importance rating determines the order in which queues are scanned for held requests and remaining quotas. The next request to be executed is taken from:

(A) the highest importance queue that has not exhausted it's quota and has a held request.

(B) the highest importance queue that has exhausted it's quota and has a held request if and only if there are no lower importance queues that have also exhausted their quota and have held requests.

Condition (A) ensures that when all request queues have pending requests, the ratio of requests as configured by the administrator is always maintained. Condition (B) allows requests to be executed even if condition (A) is not met to prevent unnecessary delays when other types of requests are not being issued. This allows request queues to operate at full speed when other queues are not being used.

Given this, a queue with a higher importance rating will tend to exhaust its quota sooner than a queue with a lower importance, but condition (B) will allow for "free" executions if there are no lower importance requests being held. It is desirable to give latency sensitive request types higher importance ratings due to this behavior.

Quotas are refreshed when:

(C) the quota for every queue reaches zero; or (D) more than one queue has exhausted its quota and two or more of these queues have held requests.

Condition (C) indicates that all quotas are exhausted and hence the quotas for each queue can be reset and the cycle can begin again. Condition (D) indicates that there is more than one type but not every type of request being issued. This is a situation that condition (B) would lead to one queue dominating execution by being continually granted "free" executions but processing needs to continue ensuring that the configured ratio of requests is observed. Hence the quotas are reset to enable this. In essence, this provides a method for enforcing a quota only when it needs to be enforced. This improves both throughput and latency and prevents starvations when one or more types of requests dominate the others.

In the example described above, only read and write quotas are configured because the metadata queue is given an infinite quota. In other words, metadata requests are considered to be both more important and more latency sensitive than either reads or writes. As a result the algorithm described above is simplified significantly, so that the system administrator can be requested to configure a simple M:N read:write ratio. In actuality there is a L:M:N metadata:read:write ratio where L is fixed at infinity.

With reference to the conditions above, in the described example if there is a metadata request held on the queue, then condition (A) will always execute it first. If there are no metadata requests held, then reads or writes are processed depending on condition (A) or (B). It also means that the quota reset occurs when condition (D) comes true, as condition (C) never occurs due to the metadata quota being infinite.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for processing access requests, the method comprising:
    configuring metering of access requests by setting a quota and an importance rating for each queue of a plurality of queues at a file system server based on user input, wherein the quota corresponds to a ratio of read requests versus write requests stored in the plurality of queues;
    sorting received access requests into the plurality of queues based on respective types of access requests, wherein each of the plurality of queues is associated with a type of access request, the one or more access requests received at the file system server from one or more compute nodes; and
    identifying which of the received access requests from the one or more compute nodes to process by:
        scanning the plurality of queues in an order based on the importance rating of each queue of the plurality of queues, and
        selecting an access request to process in a first queue of the plurality of queues by identifying that the first queue is associated with a first quota has not been exhausted when the number of read requests versus write requests stored in the plurality of queues is in accordance with the ratio, wherein the first quota corresponds to a number of access requests to be processed from the first queue while at least one other queue of the plurality of queues has a second quota that has not been exhausted and contains at least one access request that has not been processed.

2. The method of claim 1, wherein an access request that is latency sensitive is sorted into a queue with a high importance rating.

3. The method of claim 1, wherein types of access requests include read requests, write requests, and metadata requests.

4. The method of claim 3, wherein at least one queue of the plurality of queues is associated with metadata requests.

5. The method of claim 4, wherein the quota for the at least one queue associated with metadata requests is set to infinity such that a queued metadata request is processed before other queued access requests.

6. A non-transitory computer readable storage medium having embodied thereon a program executable by a processor to perform a method for processing access requests, the method comprising:
    configuring metering of access requests by setting a quota and an importance rating for each queue of a plurality of queues at a file system server based on user input, wherein the quota corresponds to a ratio of read requests versus write requests stored in the plurality of queues;
    sorting received access requests into the plurality of queues based on respective types of access requests, wherein each of the plurality of queues is associated with a type of access request, the one or more access requests received at the file system server from one or more compute nodes; and
    identifying which of the received access requests from the one or more compute nodes to process by:
        scanning the plurality of queues in an order based on the importance rating of each queue of the plurality of queues, and
        selecting an access request to process in a first queue of the plurality of queues by identifying that the first queue is associated with a first quota has not been exhausted when the number of read requests versus write requests stored in the plurality of queues is in accordance with the ratio, wherein the first quota corresponds to a number of access requests to be processed from the first queue while at least one other queue of the plurality of queues has a second quota that has not been exhausted and contains at least one access request that has not been processed.

7. The non-transitory computer readable storage medium of claim 6, wherein an access request that is latency sensitive is sorted into a queue with a high importance rating.

8. The non-transitory computer readable storage medium of claim 6, wherein types of access requests include read requests, write requests, and metadata requests.

9. The non-transitory computer readable storage medium of claim 8, wherein at least one queue of the plurality of queues is associated with metadata requests.

10. The non-transitory computer readable storage medium of claim 9, wherein the quota for the at least one queue associated with metadata requests is set to infinity such that a queued metadata request is processed before other queued access requests.

11. A system for processing access requests, the system comprising:
    a plurality of compute nodes; and
    a file system server, wherein the file system server:
        configures metering of access requests by setting a quota and an importance rating for each queue of a plurality of queues at a file system server based on one or more user settings, the quota corresponding to a ratio of read requests versus write requests stored in the plurality of queues;
        sorts received access requests into the plurality of queues based on respective types of access requests, wherein each of the plurality of queues is associated with a type of access request, the one or more access requests received at the file system server over the network interface from the one or more compute nodes; and
        identifies which of the received access requests from the one or more compute nodes to process by:
            scanning the plurality of queues in an order based on the importance rating of each queue of the plurality of queues, and
            selecting an access request to process in a first queue of the plurality of queues by identifying that the first queue is associated with a first quota that has not been exhausted, the first quota corresponding to a number of access requests to be processed from the first queue while at least one other queue of the plurality of queues has a second quota that has not been exhausted and contains at least one access request that has not been processed.

12. The system of claim 11, wherein an access request that is latency sensitive is sorted into a queue with a high importance rating.

13. The system of claim 11, wherein types of access requests include read requests, write requests, and metadata requests.

14. The system of claim 13, wherein at least one queue of the plurality of queues is associated with metadata requests.

15. The system of claim 14, wherein the quota for the at least one queue associated with metadata requests is set to infinity such that a queued metadata request is processed before other queued access requests.

* * * * *